United States Patent

[11] 3,604,266

| [72] | Inventor | George E. Chilton<br>Haworth, N.J. |
|---|---|---|
| [21] | Appl. No. | 830,648 |
| [22] | Filed | June 5, 1969 |
| [45] | Patented | Sept. 14, 1971 |
| [73] | Assignee | Computer Diode Corporation<br>Fair Lawn, N.J. |

[54] TEMPERATURE MEASURING APPARATUS
18 Claims, 10 Drawing Figs.

[52] U.S. Cl. ............................................ 73/362 R,
73/362 SC, 73/362.8
[51] Int. Cl. ............................................ G01k 7/20,
G01k 3/00, G01d 1/00
[50] Field of Search ............................................ 73/343.5,
343, 344, 362, 362 R, 362 SC; 340/194

[56] References Cited
UNITED STATES PATENTS

| 2,663,005 | 12/1963 | Obermaier | 340/194 |
| 3,254,533 | 6/1966 | Tongret | 73/362 |
| 3,379,063 | 4/1968 | Schonberger | 73/362 |

*Primary Examiner*—Louis R. Prince
*Assistant Examiner*—Denis E. Corr
*Attorney*—Darby and Darby

ABSTRACT: A temperature-measuring system comprising a disposable heat receptor that is adapted to be placed in heat-absorbing relationship with a body or atmosphere whose temperature is to be measured and apparatus for receiving the heat receptor and for measuring its temperature, the temperature measuring apparatus including means for automatically locking the temperature indicator after a predetermined time delay.

INVENTOR.
GEORGE E. CHILTON
BY
Darby + Darby
ATTORNEYS

INVENTOR.
GEORGE E. CHILTON

BY

*Darby + Darby*

ATTORNEYS 3,604,266

TEMPERATURE MEASURING APPARATUS

BACKGROUND OF THE INVENTION

The present apparatus relates generally to apparatus for measuring and displaying of temperatures but finds particular advantage in the accurate displaying of temperatures of contaminated, corrosive or other environments in which a conventional temperature-sensing and indicating device would become contaminated or attacked.

One application of the device is as a clinical thermometer, particularly for use in hospitals. In this service the conventional mercury thermometer has several disadvantages such as the need for sterilization of the thermometer before reuse to avoid cross-infection of patients. Adequate sterilization, it will be appreciated, is a particularly difficult problem because nontoxic materials must be used, which generally are not good sterilizers, at ordinary room temperature. Another disadvantage of the conventional thermometer is the high rate of breakage of glass resulting in a high cost per each usage. Other disadvantages of the conventional thermometer include the necessity for shaking down the thermometer after each use, and the long time required for the thermometer to reach equilibrium after being placed in the body cavity, resulting in the consuming of a great deal of the time of doctors and nurses in attendance as well as the difficulty of reading the conventional mercury thermometer, etc.

There has been proposed the use of electronic thermometers which are fast reading and which have large dials, so as to be easily read. However, such devices have not been well received by the medical profession because of the difficulty of sterilizing the probes and the ease with which such probes become contaminated by fecal matter or saliva.

Accordingly, attempts have been made to provide devices having disposable sensing means. One such approach is shown in U.S. Pat. No. 3,379,063, patented Apr. 23, 1968, by Milton Schonberger. This patent discloses an apparatus which employs a heat collector which is inserted in the body cavity until it reaches the temperature of the environment and which is then removed and inserted in a reader, which is described as a thermistor-type device. The temperature of the heat collector is then measured. There are several disadvantages to the Schonberger device which the present invention overcomes.

In the Schonberger device the same heat collector surface which is exposed to the contaminating environment of the body cavity is placed in contact with the sensing element. Thus, the sensing element tends to become contaminated by any adhering fecal matter, saliva, or other foreign agent. In addition to the general undesirability of such contamination, the heat conduction characteristics of the surface are changed, rendering suspect any further temperature measurements.

SUMMARY OF THE INVENTION

Contrary to the teachings of the Schonberger patent, where the heat-absorbing mass is a viscous or semisolid material of poor thermal conductivity, applicant has found it advantageous to use a material of high thermal conductivity with high heat capacity. By use of a novel heat sensor, good heat transfer from the heat collector to the sensor is obtained. Presently, iron is a preferred heat absorber since it has excellent thermal conductivity and a heat capacity at low cost per unit volume. The low cost of the heat absorber makes feasible its use as a disposable item.

In combination with the heat receptor probe, the temperature indicating device comprises a casing including thermoelectric sensor means mounted within the casing and arranged to receive the slug of the heat receptor in heat transfer arrangement, for providing an electrical signal responsive to the temperature of the slug. Also included are calibrated indicating means, mounted within the casing and responsive to the signal for providing a visual indication of the slug temperature. The invention in a preferred form additionally includes means, mounted within the casing and responsive to manual actuation, for fixing the reading of the indicating means at a predetermined time after actuation within which the thermoelectric sensor means has substantially achieved the full slug temperature by heat transfer without significant loss of heat of the slug and so that the temperature indication is thereafter maintained despite further cooling of the heat receptor and sensor means.

Accordingly, it is an object of this invention to provide improved temperature-indicating means.

It is another object of this invention to provide, in combination with said improved temperature indicating means, a mechanism for initiating and terminating the movement of an indicator pointer at an appropriate time.

It is a further object of this invention to provide means for timing the duration of the operation of the temperature-measuring apparatus.

An additional object of this invention is to provide pushbutton means for quickly activating the temperature-indicating apparatus.

These and other objects, features and advantages of the invention will, in part, be pointed out with particularity and will, in part, become obvious from the following more detailed description of a preferred form of the invention taken in conjunction with the accompanying drawing which forms an integral part thereof.

DESCRIPTION OF THE PREFERRED EMBODIMENT

Figure 1:
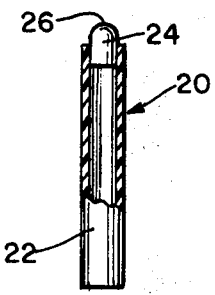
FIG. 1 is an elevational view, partially broken away, of a heat transfer probe that may be used with the present invention.
Figure 2:
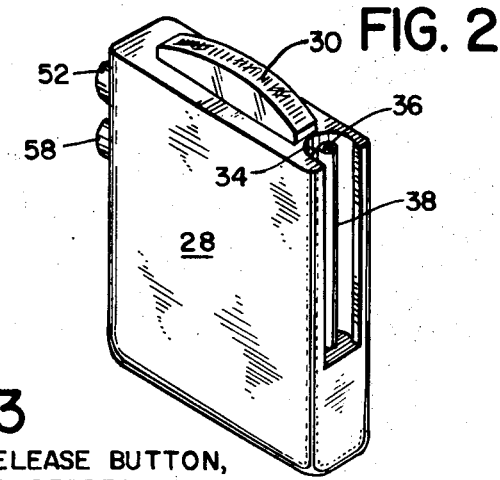
FIG. 2 is a perspective view, partially broken away, of the temperature-indicating apparatus used in the present invention.

Referring now to FIGS. 1 and 2 there is shown a temperature-measuring assembly which includes a probe or heat receptor 20 having an elongated tubular stem 22 and an iron slug 24 secured in one end thereof. The heat receptor 20 may be made of cellulose acetate, polystyrene, polyethylene, polypropylene or other suitable plastic, and formed in any suitable manner, such as by extrusion, molding or the like. The slug in one form is approximately ¼ inch in diameter by ½ inch long and is inserted such that one face 26 may be placed into intimate contact with an environment that is to have its temperature measured. The slug 24 is selected to have exceedingly good heat transfer characteristics and, for the slug size mentioned above, a stable temperature will be reached in approximately 40 seconds. Thus, if the probe is left in position for approximately 1 minute, the maximum temperature will be transferred; that is, the probe temperature will attain that of the environment to be measured.

Figure 4:
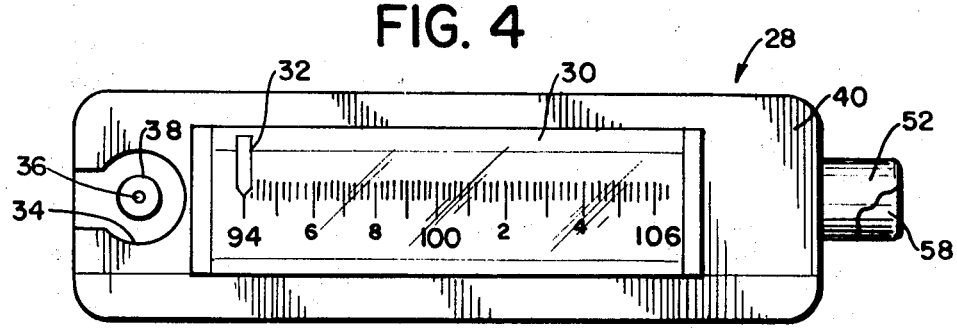
FIG. 4 is a top-plan view of the temperature-indicating apparatus comprising this invention.

The temperature-indicating apparatus 28 comprising the present invention includes a calibrated scale 30 preferably visible on the top surface of the unit, a pointer 32 cooperating with the scale 30, and a socket 34 to receive the heat receptor 20 as shown in FIGS. 2 and 4.

Figure 10:
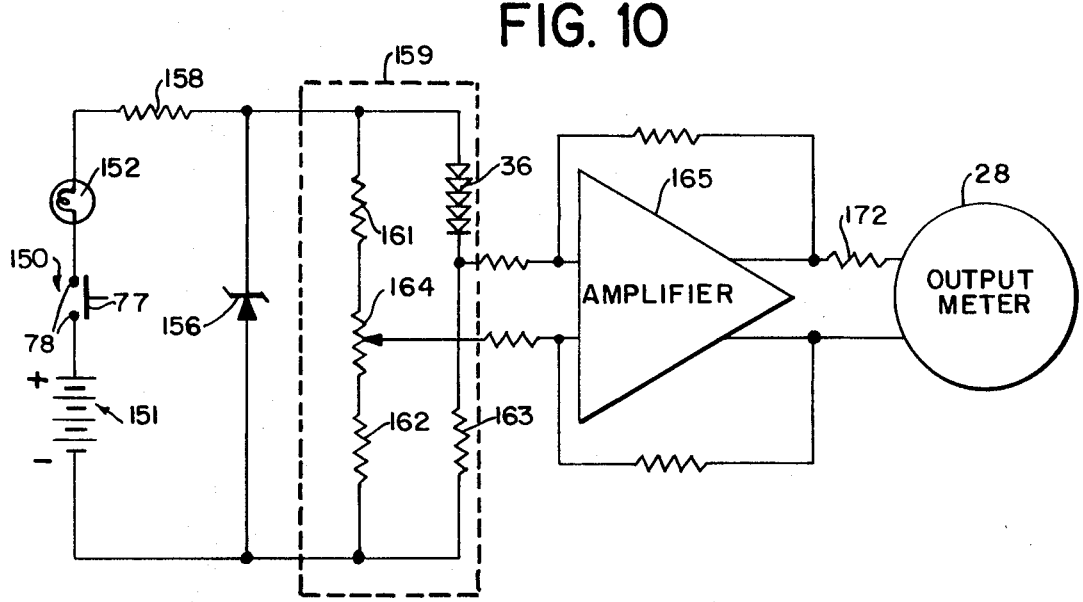
FIG. 10 is a circuit diagram for one embodiment of the present invention.

When the heat receptor 20 is in use, after attaining a stable temperature it is removed from the body cavity and is placed in the socket 34 such that the slug 24 is in contact with a sensing element 36. It should be noted that the sensing element 36 is positioned on the top of a stem 38 that is within the socket 34 and that the inside diameter of the heat receptor 20 is just slightly larger than the outside diameter of the stem 38. The hollow stem 22 of the heat receptor probe 20 is placed around the heat-sensing stem 38, so that the slug 24 rests on and is in thermal contact with the sensing element 36. A heat-conducting grease, such as silicone grease, may be applied between the slug 24 and sensing element 36 to improve heat transfer to the sensing element 36. The sensing element 36 is used in a suitable electrical circuit as illustrated by FIG. 10 and is completely described in my copending application, Ser. No. 733,738, which was filed on May 21, 1968 now abandoned in favor of continuation-in-part application Ser. No. 843,276. The construction and function of one form of heat receptor is also fully described in my aforementioned pending application.

Figure 5:
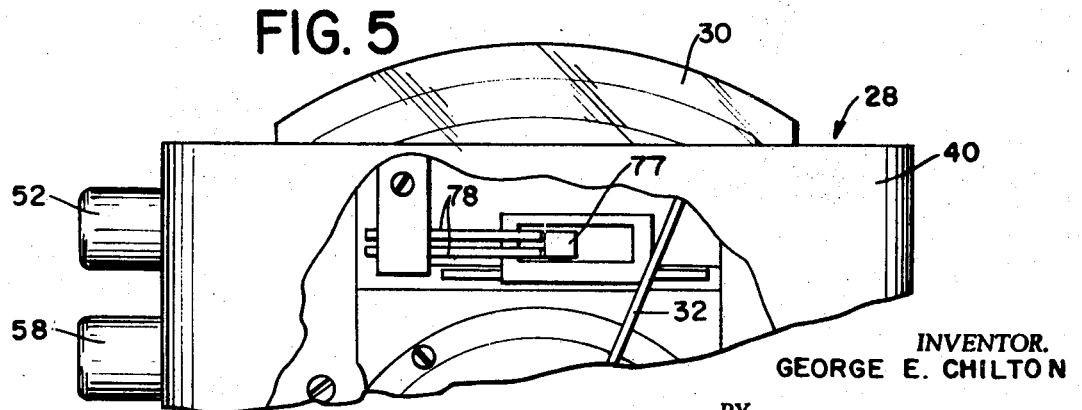
FIG. 5 is an enlarged fragmentary rear elevational view partially broken away of a portion of the temperature-indicating apparatus comprising this invention.
Figure 6:
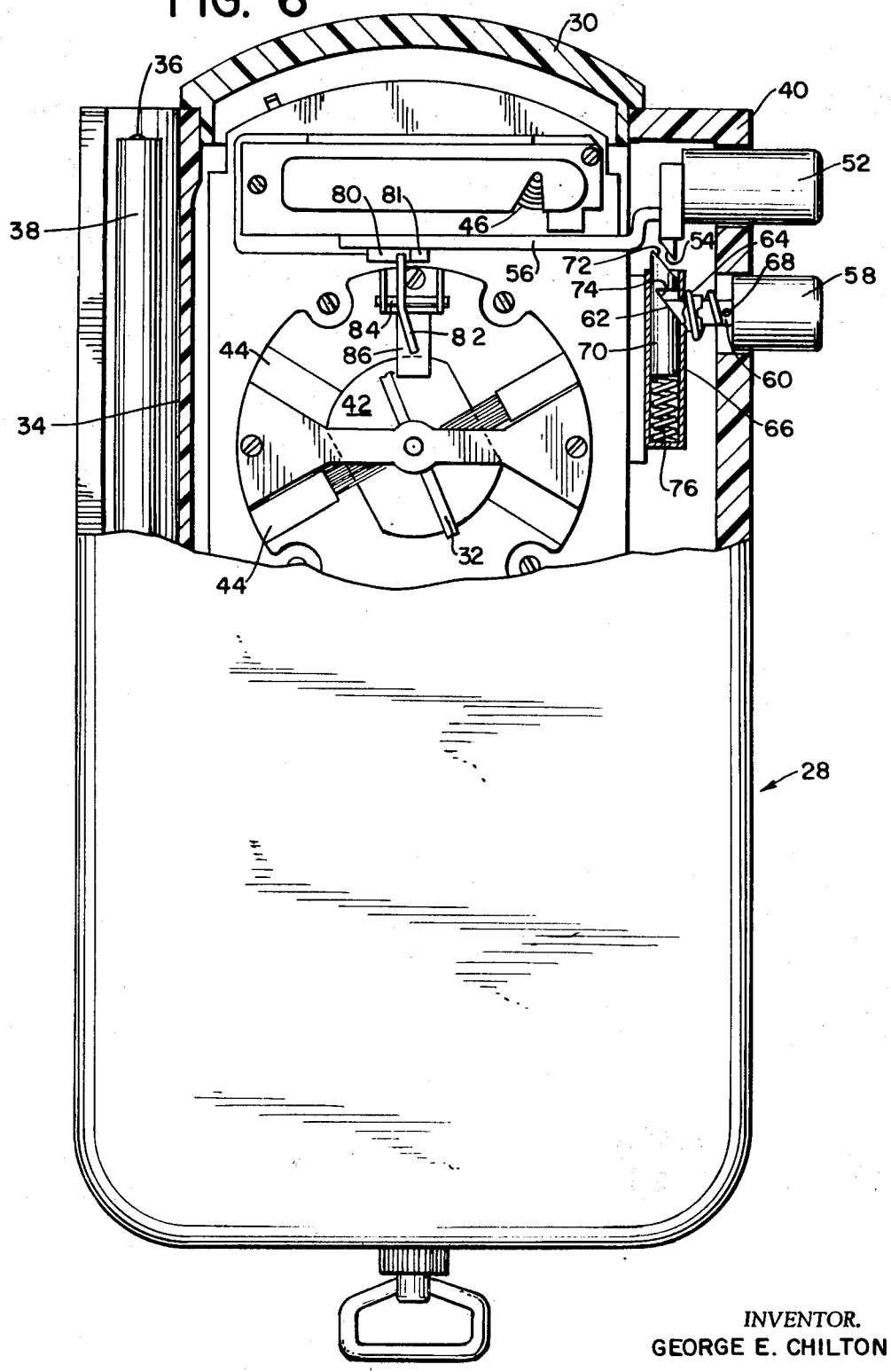
FIG. 6 is an enlarged front elevational view, partially broken away, illustrating a portion of the temperature-sensing element.
Figure 9:
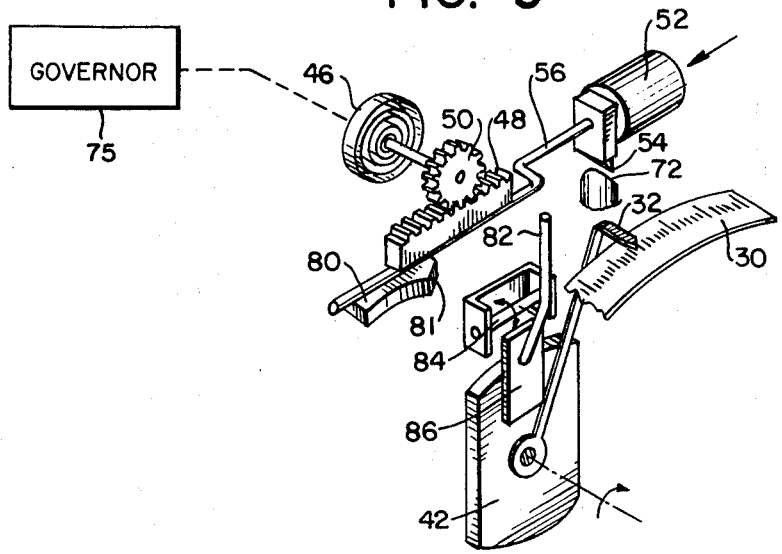
FIG. 9 is an exploded, pictorial view schematically illustrating several components of this invention.

Turning now particularly to FIGS. 4, 5 and 6, there is shown a preferred construction of temperature-indicating device 28 according to the present invention. A casing 40 is provided to house a conventional meter assembly that includes the scale 30 and the pointer 32 as well as a rotor 42 that pivotally supports the pointer. There is also provided, in a conventional manner, a fixed, permanent magnet 44 surrounding the rotor 42. Referring to FIG. 9, the casing 40 also houses a spring motor comprised of a coil spring 46, and a pinion 50 which is coupled to the spring 46 and that is also in meshing engagement with a rack 48. The rack 48 drives the pinion 50 and thereby winds up the spring 46 when a first button 52 is depressed inwardly of the casing 40. A toothlike latch member having a slanted surface 54 and an arm 56 are also mounted on the first button 52 inwardly of the wall of the casing 40.

Figure 7:
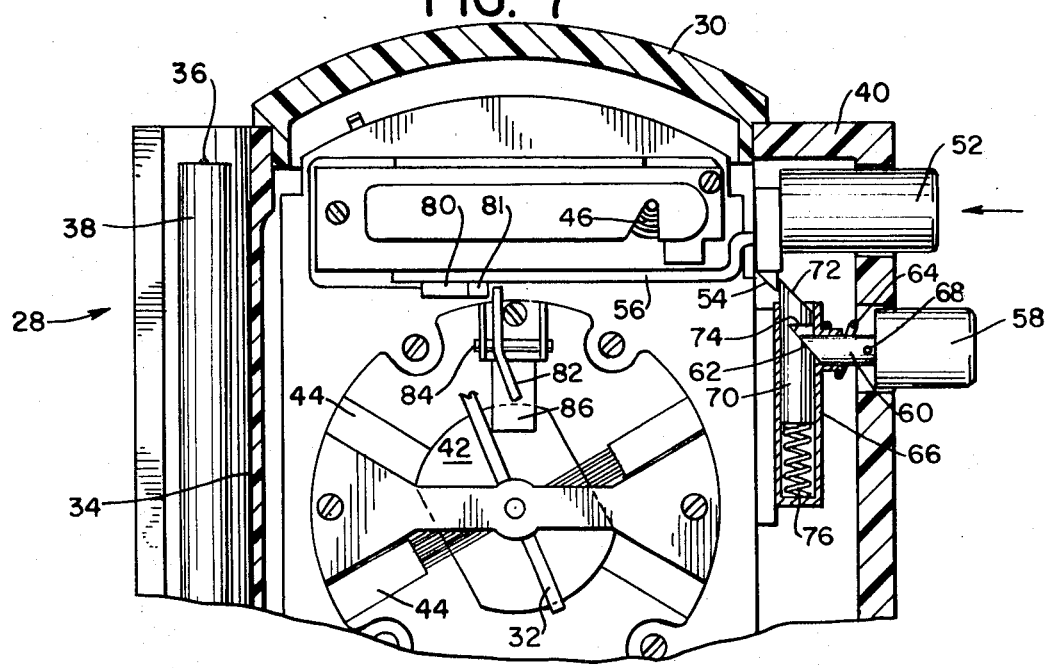
FIGS. 7 and 8 are fragmentary elevational views illustrating the relationship of certain components of the present invention during the operating cycle.

As seen in FIG. 6, a second button 58 is also mounted on the casing 40 and includes a stem 60 having a beveled end face 62 at the inner end thereof. The second button 58 is biased outwardly with respect to the casing 40 by a compression spring 64 that extends between a sleeve 66 rigidly fixed within the casing 40 and a pin 68 integral with the button stem 60. A rod member 70 that combines the function of a cam and a latch is slidably mounted in the sleeve 66 and includes a toothlike portion having a first slanted face 72 that cooperates with the latch member 54 and a second slanted face 74 that acts as a cam surface. Before the timer is set, as shown in FIG. 6, the latch member 54 integral with the first button 52 is positioned on the right side of the first slanted face 72. When the first button 52 is depressed, the slanted surface of the latch member 54 pushes against the first slanted face 72 and moves rod 70 downwardly against the force of a compression spring 76 that is contained within the sleeve 66. When the latch member 54 moves to the left of the rod 70, as shown in FIG. 7, the first button 52 is thereby held in the latched condition with the spring motor fully wound.

Figure 8:
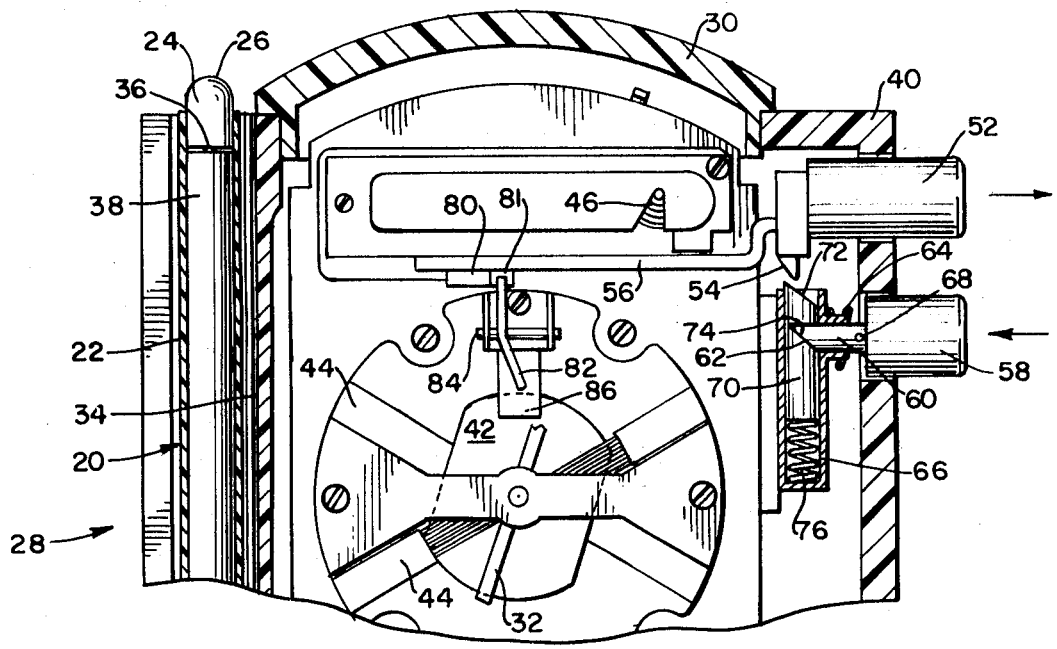

After the heat receptor 20 is removed from its environment and placed in the socket 34 the second or release button 58 is immediately depressed. It will be seen in FIG. 8 that the beveled end face 62 on the inner end of the stem 60 of the release button 58 bears against the second sloping face 74 on the rod 70 thereby once again pushing the rod 70 downwardly, this time to release the latch member 54 from engagement with the surface of the rod 70 that is opposite to slanted face 72. The spring 46 then unwinds and, together with the rack 48 and the pinion 50, drives the arm 56 to the right. The rate that spring 46 unwinds is controlled by a conventional governor, shown as block 75 in FIG. 9, such as an escapement mechanism typically used in clocks or watches. The arm 56 has secured thereto a shorting bar 77 as shown in FIG. 5 that comes into contact with a pair of fixed contacts 78 approximately 2 seconds after the second button 58 is depressed and the arm 56 starts to travel. This action serves to close and energize the circuit shown in FIG. 10.

A barlike cam member 80 having a sloping surface 81 is also secured to the arm 56 (FIGS. 6 and 9) and travels together therewith to the right after the release button 58 is depressed and the timer is unlatched, as described above. At an appropriate time the cam member 80 passes beneath one end of a pin 82 that is pivotally mounted on a bracket 84 which is secured to the nonmovable portion of the meter assembly. When the cam surface 81 bears upwardly against and raises the first end of the pin 82 it will automatically depress the second or opposite end of the pin and move the second pin end into engagement with a flexible plate 86 that is positioned over the rotor 42 of the meter assembly. Continued movement to the right of the cam member 80 will further depress the second end of the pin 82 and the plate 86 and will thereby clamp the rotor 42 so as to prevent movement of the indicator pointer 32.

By way of summary then, depression of the first button 52 acts to wind the spring 46 through the rack and pinion assembly 48 and 50. Depression of the second or release button 58, immediately after the probe 20 is placed on the stem 20, unlatches the timer and sets the cam member 80 in motion. Approximately 2 seconds after the release button 58 is depressed, the moving contact 77 engages the fixed contact 78 and closes the electrical circuit shown in FIG. 10. The timer is set to be actuated for approximately 10 seconds after the second button 58 is depressed. That is, the rotor 42 will be locked with the pointer 32 at the temperature that has been measured at approximately 10 seconds after the heat receptor 20 is placed in the socket 34.

Figure 3:
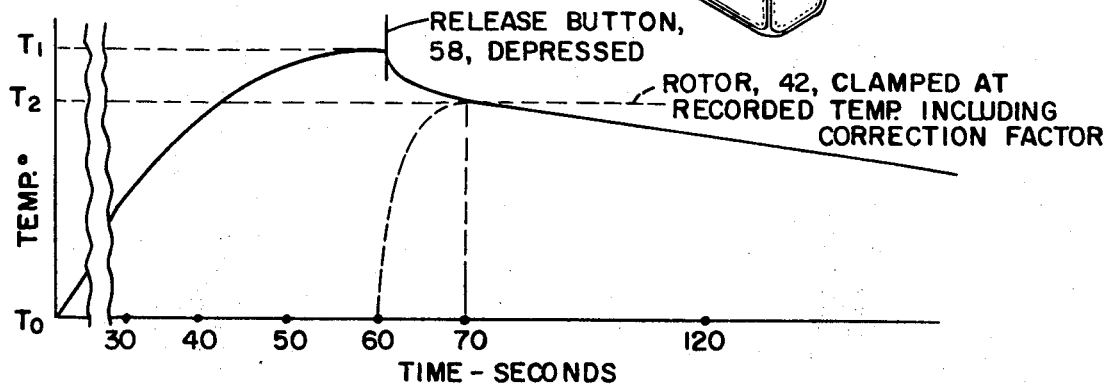
FIG. 3 is a graph showing the temperature-versus-time relationship of the heat transfer probe and sensing element during different portions of the temperature-measuring cycle.

Referring to FIG. 3, there is shown a graph which shows the rise in temperature of the heat absorption slug from $T_0$, which would normally be room temperature, to $T_1$, the temperature of the environment. The operator removes the heat absorption slug from the body cavity by means of the stem, thus avoiding any direct contact with the patient, and slips the hollow portion of the stem 22 over rod 38, as shown in FIG. 5. This places inner surface of the probe slug 24 in intimate contact with a sensing element 36 in the tip of the rod. While the sensing element 36 may be a thermistor or thermocouple, I presently prefer to use a multijunction-diode temperature sensing element as described in U.S. Pat. No. 3,330,158.

Upon inserting the heated probe slug in the readout instrument 28, the high thermal conductivity of the slug 24 and the high thermal conductivity of the sensing element 36 cooperate to quickly heat the diode sensor to the temperature of the slug 24 with minimal reduction in the temperature of the slug. Since the mass of the slug 24 is preferably in the order of 1000 times (or more) as great as the mass of the diode sensor, the temperature drop of the slug resulting from heating of the sensor is insignificant. This new temperature is shown in FIG. 3 as $T_2$ and represents a drop of but a fraction of a degree. The temperature drop from $T_1$ to $T_2$ is essentially constant and the meter scale may simply be calibrated to compensate therefor. In any event, the automatic locking of the rotor 42 and the pointer 32 after a predetermined time delay that substantially coincides with the constant temperature drop between $T_1$ and $T_2$ assures that an accurate reading can be taken.

In FIG. 10 there is shown diagrammatically a suitable circuit for use in conjunction with the multijunction-diode sensor. Switch 150, which is formed by contacts 77 and 78, closes a circuit to battery 151 and energizes a series-connected pilot lamp 152, to indicate to the operator that the device is operational. Zener diode 156, in conjunction with dropping resistor 158 and lamp 152, acts as a voltage regulator. The regulated power is then supplied to the diagonals of a differential sensing bridge 159, one arm of which is the multijunction diode 36 and the other arms of which are resistors 161, 162 and 163. This bridge circuit may be that shown, for example, in U.S. Pat. No. 3,330,158. In series with bridge arms 161 and 162, there is provided a potentiometer 164 for initial adjustment of the circuit. This potentiometer may for example be of the trimmer type. The output of the bridge is fed to a differential operational amplifier 165 and the opposed outputs are applied to the output meter 28. A fixed resistor 172 is provided in series with the meter 28 for gain-adjustment purposes. In place of resistors 161, 162 and 163, junction diodes may be employed. This latter arrangement is disclosed, for example, in U.S. Pat. No. 3,330,158. It will be understood that other measuring circuits may be employed, as may be advantageous.

From the foregoing it will be evident that means have been provided for accurately locking the temperature-indicator pointer after a precise and predetermined time delay that is in the order of but a few seconds. The device is very simple to operate in that only one such button need be depressed to wind up a spring motor and to latch it in that condition so that it is ready for use. A second push button is depressed immediately after the heat receptor is placed in the temperature indicator so as to unlatch the slide member carried by the first button, to close a circuit and to set the timer mechanism in motion. A cam carried by the slide member acts to clamp the meter rotor and thereby arrest the movement of the indicator point at the precise time that the recorded heat has been transferred from the probe to the indicator sensing element. Thereafter, even though the heat will continue to dissipate, the pointer will still indicate the recorded temperature. The pointer remains clamped until ready for the next cycle, initiated by depressing button 52.

The foregoing is a preferred embodiment of the invention as presently contemplated. It is to be understood however, that various changes and modifications may be made by those skilled in the art without departing from the spirit of the invention.

I claim:

1. A temperature indicating device for use with a heat receptor probe of the type having a heat-receiving slug, comprising:

a casing;
   thermally responsive sensor means mounted in said casing and arranged to receive said slug of said heat receptor in heat transfer relationship for providing an electrical signal responsive to the temperature of said slug;
   calibrated indicating means mounted within said casing and responsive to said signal for providing a visual indication of the slug temperature;
   means mounted within said casing and responsive to manual actuation for fixing the reading of said indicating means;
   and means for delaying said fixing for a predetermined interval of time after said actuation, said delaying means comprising a governor operably associated with said fixing means to determine the length of said interval of time within which interval said thermally responsive sensor means substantially achieves the full slug temperature by heat transfer without significant loss of heat of the slug and so that the temperature indication is thereafter maintained despite further cooling of the heat receptor and sensor means.

2. A device as described in claim 1, wherein said calibrated indicating means includes a meter assembly comprising an electrically responsive rotor, a pointer coupled to said rotor for movement thereby, and a calibrated scale in juxtaposition with the free end of said pointer.

3. A device as described in claim 2 wherein said manually actuatable reading-fixing means includes: a spring motor contained within said casing, said spring motor capable of being latched and unlatched, means mounted on said casing for winding said spring motor in a wound condition, and means mounted on said casing for latching and unlatching said spring motor and for clamping said indicating means at the end of said time interval which interval is initiated by said unlatching.

4. A device as described in claim 3 which includes a source of current and a normally open switch, said switch being between said thermally responsive sensor and said source.

5. A device as described in claim 1 further including means for closing said switch coupled to and actuated by said unlatching means.

6. A device in accordance with claim 3 wherein said means for winding said spring motor comprises a first push button slidably mounted on said casing, a rack integral with said pushbutton and a pinion in meshing engagement with said rack, said pinion being coupled to said spring motor, said means for latching said spring motor in the wound condition comprising a first toothlike member integral with said first pushbutton, a rod having a second toothlike member, said rod being mounted in said casing and spring means biasing said second toothlike member into latching engagement with said first toothlike member.

7. A device in accordance with claim 6 including a release means, said release means comprising a second pushbutton mounted on said casing, said second pushbutton having a first cam surface on the inner end thereof and a second cam surface on said rod in opposition to said first cam surface whereby when said second pushbutton is depressed, said first cam surface bears against said second cam surface and moves said second toothlike member out of latching engagement with said first toothlike member.

8. A device in accordance with claim 6 including spring means normally biasing said second push button in a direction outwardly of said casing.

9. A device in accordance with claim 6 wherein said clamping means comprises an elongated arm integral with said first pushbutton, a cam member mounted on said arm for movement together therewith and a cam follower having a first portion positioned in the path of said cam member and a second portion positioned in opposition to said rotor, said second portion of said cam follower being arranged to clampingly arrest the movement of said rotor when said cam member engages said first portion of said cam follower.

10. A device in accordance with claim 9 wherein said cam follower comprises a pin pivotally mounted intermediate the end portions thereof on a nonmovable portion of said meter assembly and said cam member is a bar having a sloping surface.

11. A device in accordance with claim 9 wherein there is further included a flexible plate intermediate said second portion of said cam follower and said rotor whereby said second portion of said cam follower is arranged to depress said flexible plate into clamping engagement with said rotor.

12. A device in accordance with claim 9 including circuit closing means comprising movable contact means integral with said arm and fixed contact means positioned along the path of said movable contact means whereby when said release means is actuated said movable contact means will engage said fixed contact means at a predetermined time after said spring motor is unlatched and will remain in engagement therewith during the time said rotor is clamped.

13. A temperature indicating device for use with a disposable heat receptor of the type having a tubular stem and a metal slug in one end thereof, comprising:

a casing;
   thermally responsive sensor means, mounted in said casing and arranged to receive said metal slug in heat transfer relationship, for providing a voltage responsive to the temperature of said slug;
   a meter assembly, mounted in said casing and responsive to said voltage, said movement including a rotor, a pointer coupled to said rotor for movement thereby, and a calibrated scale in juxtaposition with the free end of said pointer;
   a spring motor within said casing;
   winding means, mounted on and within said casing, for winding said spring motor, said winding means including a first pushbutton slidably mounted on said casing, a rack connected to said pushbutton, and a pinion in meshing engagement with said rack, said pinion being coupled to said spring motor;

latching means, mounted within said casing, for latching said spring motor in the wound condition, said latching means including a first toothlike member integral with said first pushbutton, a rod being mounted in said casing and having a second toothlike member, and spring means biasing said second toothlike member into latching engagement with said first toothlike member;

releasing means mounted on and within said casing for latching and unlatching said spring motor, including a second push button mounted on said casing and having a first cam surface on the inner end thereof, a second cam surface on said rod in opposition to said first cam surface, whereby, when said second push button is depressed, said first cam surface bears against said second cam surface and moves said second toothlike member out of latching engagement with said first toothlike member;

clamping means, mounted within said casing and responsive to said releasing means, for clamping said rotor at a predetermined time after said spring motor is unlatched, said clamping means including an elongated arm integral with said first pushbutton, a cam member mounted on said arm for movement together therewith, and a cam follower having a first portion positioned in the path of said cam member and a second portion arranged to clampingly arrest the movement of said rotor when said cam member engages said first portion of said cam follower;

and a normally open-circuit electrical switch, having movable contacts connected to said elongated arm and fixed contacts positioned along the path of said movable contacts, for applying said temperature-responsive voltage to said meter assembly, whereby when said release means if actuated said movable contacts will engage said fixed contacts at a time predetermined by movement of said spring motor and rack and pinion after said spring motor is unlatched and will remain in engagement therewith during the time said rotor is clamped.

14. In a temperature-indicating device of the type having a meter assembly, said assembly including an electrically responsive rotor, a pointer coupled to said rotor for movement thereby and a calibrated scale in juxtaposition with the free end of said pointer, said assembly responsive to a temperature change detected by a sensing element, the improvement comprising means for arresting the meter assembly after a predetermined time delay, said arresting means comprising:

motor means;

an actuator driven by said motor means; and means juxtaposed to the meter assembly and engageable by said actuator at a predetermined time after said motor means starts to drive said actuator for stopping the rotation of the meter assembly rotor.

15. The device in accordance with claim 14 wherein said motor means is a spring.

16. The device in accordance with claim 14 wherein said actuator is a cam and said means for clamping the meter assembly is a follower mounted in juxtaposition with the rotor of said assembly, said follower having a first portion adapted to be engaged by said cam at said predetermined time and a second portion arranged to apply a clamping force against a surface of the rotor at said predetermined time.

17. The device in accordance with claim 16 further including a flexible plate adapted to be forced against the surface of the rotor by said second portion of said follower.

18. The device in accordance with claim 16 wherein said follower is a pin pivotally mounted intermediate said first and second portions on a fixed portion of the meter assembly.